Dec. 23, 1952  F. A. WETTSTEIN  2,622,872
PNEUMATIC SPRINGING AND DAMPING ARRANGEMENT FOR VEHICLES
Filed Nov. 27, 1945  5 Sheets-Sheet 1

Inventor:
Fritz Alexander Wettstein
By James C. Marble
his Attorney

Dec. 23, 1952 F. A. WETTSTEIN 2,622,872
PNEUMATIC SPRINGING AND DAMPING ARRANGEMENT FOR VEHICLES
Filed Nov. 27, 1945 5 Sheets-Sheet 2

Inventor:
Fritz Alexander Wettstein
By Jarvis C. Marble
his Attorney

Dec. 23, 1952      F. A. WETTSTEIN      2,622,872
PNEUMATIC SPRINGING AND DAMPING ARRANGEMENT FOR VEHICLES
Filed Nov. 27, 1945      5 Sheets-Sheet 3

Fig. 8

Inventor
Fritz Alexander Wettstein
By Jarvis C. Marble
his Attorney

Dec. 23, 1952 F. A. WETTSTEIN 2,622,872
PNEUMATIC SPRINGING AND DAMPING ARRANGEMENT FOR VEHICLES
Filed Nov. 27, 1945 5 Sheets-Sheet 4

Patented Dec. 23, 1952

2,622,872

UNITED STATES PATENT OFFICE 2,622,872

PNEUMATIC SPRINGING AND DAMPING ARRANGEMENT FOR VEHICLES

Fritz Alexander Wettstein, Traneberg, Sweden

Application November 27, 1945, Serial No. 631,054
In Sweden November 30, 1944

11 Claims. (Cl. 267—64)

The present invention refers to a pneumatic springing and damping arrangement for vehicles, particularly for automobiles.

The description refers to the accompanying drawings, of which Figs. 2 to 4 diagrammatically show the principle on which the invention is based as compared with the conventional arrangement for springing and damping shown in Fig. 1.

Figure 1:
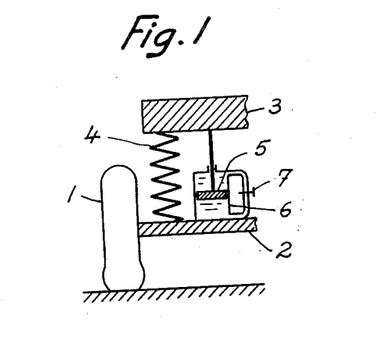

Fig. 1 shows diagrammatically the conventional arrangement of spring and shock absorber for automobiles. 1 denotes one of the wheels and 2 is part of the unsprung mass consisting of the wheel rim and hub together with the axle and parts connected therewith. Between the unsprung mass 2 and the sprung mass 3, consisting of the car body with frame, motor and load, are arranged in parallel with each other the spring 4 and the damping arrangement or shock absorber consisting of cylinder 6, containing a liquid, piston 5 and a throttling control 7.

For good riding qualities it is necessary that an oscillation imposed upon the sprung mass 3 is damped out as quickly as possible. For this purpose, the damping constant, i. e. the damping force per unit of velocity of the damping piston 5, must be adjusted to the frequency of oscillation of the sprung mass 3, which usually is between 60 and 100 oscillations per minute. The oscillations forced upon the wheel axle 2 when driving over a road wave at high speed, may however have a frequency which is more than 10 times as large as the free frequency of the sprung mass 3. The resulting fast movement of the wheel axle 2 would thus cause the damping arrangement comprising piston 5 to exert excessive forces upon the sprung mass 3. To avoid this, it has been customary to adapt the damping constant to the free frequency of the sprung mass 3 by the provision of suitable throttle openings in the shock absorber and to prevent excessive damping forces by the provision of suitable overflow valves. The disadvantages of this solution are that the damping action for the sprung mass 3 becomes insufficient and that the damping force does not follow a sine curve, i. e. that the action of the shock absorber is not harmonic, but actually produces shock. During all large and fast oscillations, the damping force remains constant over a large part of the oscillations with more or less sudden shocks when the damping force changes from one direction to the other.

Figure 2:
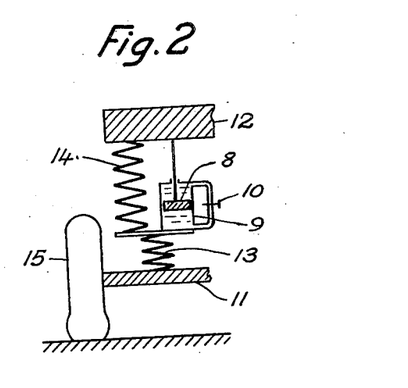

A better solution of this problem may in accordance with the invention be obtained with the arrangement shown in Fig. 2. In this case, the damping arrangement, consisting of piston 8, liquid filled cylinder 9 and throttling control 10, is not inserted directly between axle 11 and the sprung mass 12, but instead together and in series with a spring 13. In addition, a spring 14 is arranged in parallel with the damping arrangement comprising cylinder 10. 15 denotes one of the wheels of the car. It is evident that in this case, the axle 11 may give way quickly when the wheel strikes an obstacle on the road, simply by compressing spring 13 and without causing excessive forces in the damping arrangement 10. The damping force can never exceed the force exerted by spring 13 and its changes occur smoothly and continuously with the deflection of spring 13.

Figure 3:
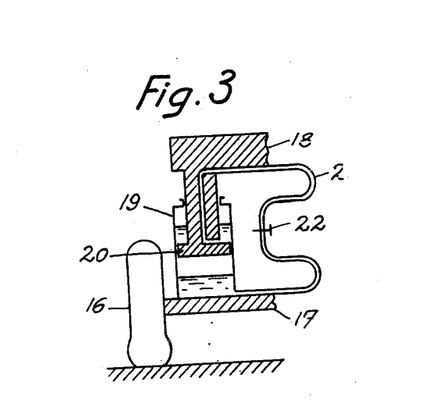

Fig. 3 shows another form of the invention, whereby the steel springs are replaced by air springs, i. e. compressed air acting on a piston movable in a cylinder. 16 denotes again one of the wheels of the car, 17 its axle and 18 the sprung mass of the car. A differential cylinder 19 is directly connected to axle 17. The differential piston 20, which is movable in differential piston 19, is directly connected to the sprung mass 18. The two chambers in the differential cylinder are partly filled with a liquid and partly with compressed air. The liquid spaces are interconnected with each other by a flexible conduit 21, in which a throttling control 22 is arranged. The arrangement consisting of differential piston 20 and differential cylinder 19 provides both the springing and the damping action. The springing action is obtained by the quantities of air enclosed on both sides of the differential piston 20, and the damping action is obtained by throttling the flow of liquid from one side of the differential piston 20 to the other in the throttling control 22. Similarly as with the arrangement shown in Fig. 2, the axle 17 may give way for obstacles on the road at any desired speed without inciting undue damping forces. The damping force cannot exceed the spring force exerted by the air enclosed in differential cylinder 19 and its changes occur gradually and smoothly with the changes in the compression of the air springs.

Figure 4:
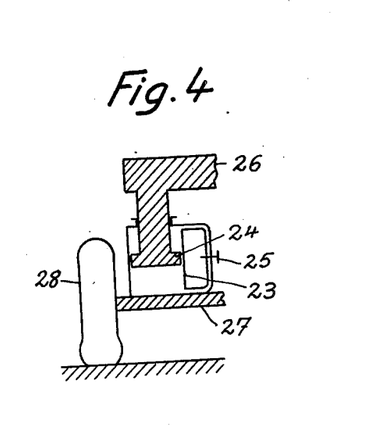

Fig. 4 shows a modification of the arrangement shown in Fig. 3. In this case, a differential cylinder 23 contains compressed air or gas only. The damping action is obtained by the throttling control 25 which causes the desired drop in pressure when part of the air flows from one side of the differential piston 24 to the other 26 is the sprung mass, 27 is the unsprung mass or axle and 28 is a wheel. Also in this case, the damping constant may be calculated for the comparatively slow oscillations of the sprung mass 26 since the much faster oscillations of the unsprung mass 27 cannot give rise to excessive damping forces due to the compressibility of the damping medium, i. e. of the compressed air.

The understanding of the invention may be facilitated by the introduction of the terms static and dynamic spring rates. Static spring rate denotes in the following that spring rate (for example in pounds per inch of spring compression) which is obtained during static load changes, i. e. when the damping force equals zero. Dynamic spring rate denotes in the following that spring rate which is obtained during an infinitely fast movement of the sprung or unsprung mass, which is the same as if the throttling controls 8, 22 and 25 are assumed closed.

Figures 5, 6, 7:
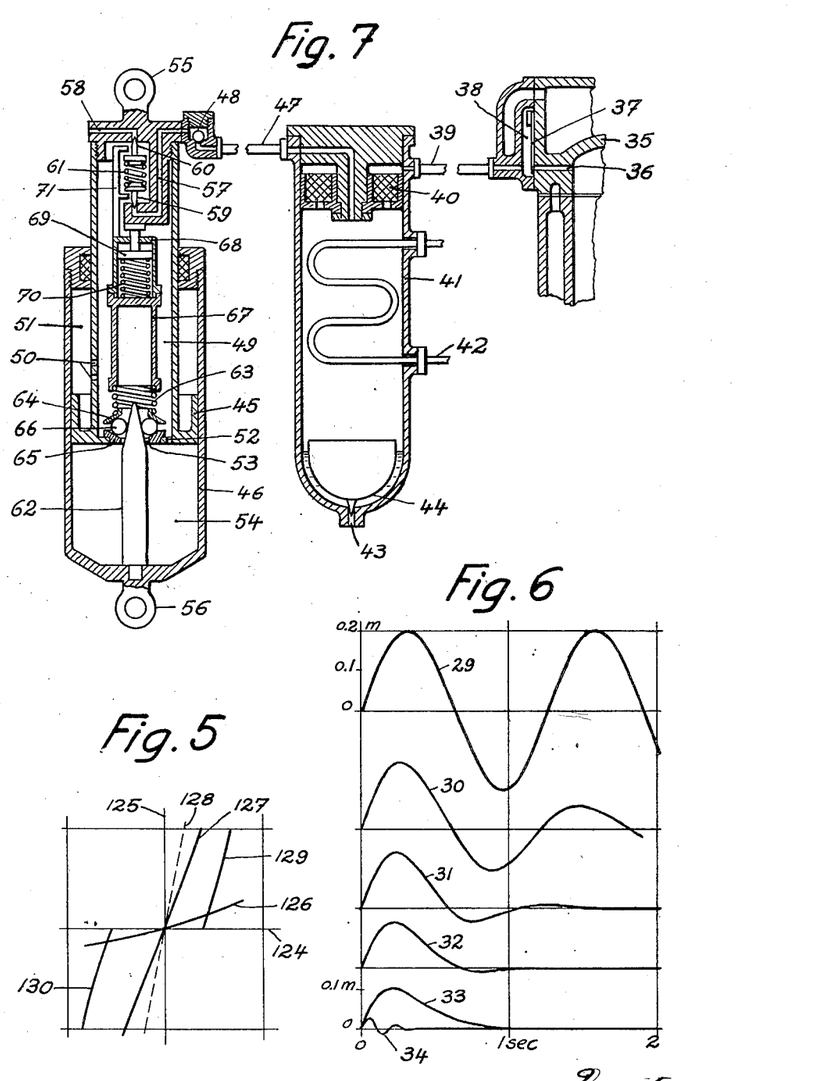
Fig. 5 is a diagram showing different spring rate curves and Fig. 6 shows how the different spring rates affect the damping action.
Fig. 7 shows a preferred form of the invention provided with an arrangement for obtaining a constant height of the spring independent of the static load.

With the conventional arrangement of spring and shock absorber according to Fig. 1, the only requirement for obtaining satisfactory damping of the sprung mass 3 is that the damping factor be adapted to the spring rate of spring 4 and to the size of the sprung mass 3. With the arrangement according to the invention as shown in Figs. 2, 3 and 4, a mathematical study of the process of damped oscillation has shown that in addition to the size of the damping constant, certain requirements with regard to the ratio between the dynamic and the static spring rates must be fulfilled in order to obtain a satisfactory damping. Thus, for example, in order to obtain aperiodic damping, where the kinetic energy of oscillation is absorbed during a single non-aperiodic oscillation, the dynamic spring rate must be 9 times as large as the static spring rate. Curves 29 to 33 in the diagram of Fig. 6 show the oscillations of the sprung mass, amplitudes plotted against time, for a certain size of the sprung mass, a certain static spring rate and increasing values of the dynamic spring rate. If the dynamic spring rate is equal to the static spring rate, no damping is obtained and the oscillation follows the sine-curve 29. Curve 30 is obtained with a dynamic spring rate twice as large as the static spring rate and this evidently results in a comparatively satisfactory damping. Curve 32 is obtained with a dynamic spring rate five times as large as the static spring rate and approaches nearly the aperiodic oscillation which is shown by curve 33.

Hitherto, the oscillation and damping of the sprung mass only has been described. Also the unsprung mass is, however, subject to oscillations, which must be damped in a satisfactory manner. The oscillation of the unsprung mass takes place between the tire and the spring arrangement. For most automobiles, the frequency of this oscillation is between 500 and 1000 oscillations per minute. Since this is about 10 times as much as the free frequency of oscillation of the sprung mass, the sprung mass may thus be considered stationary.

For the conventional arrangement shown in Fig. 1, the shock absorber acts in principle in the same way both for the oscillations of the unsprung mass 2 and for the sprung mass 3. This is due to the fact that for the unsprung mass the damping cylinder 6, and for the sprung mass the damping piston 5, is directly connected with the oscillating mass, so that the damping force in both cases acts directly on the oscillating mass. The only requirement for a satisfactory damping is therefore a sufficiently large damping constant.

For the arrangement according to the invention on the other hand, a static and a dynamic spring rate may be defined also for the oscillations of the unsprung mass, whereby these spring rates naturally differ from the static and dynamic spring rates for the sprung mass.

For example, with the arrangement shown in Fig. 2, the dynamic spring rate for the unsprung mass evidently is equal to the sum of the spring rate for the tire 15 and the spring 13. The static spring rate, obtained for wide open throttle control 9, is determined by tire 15, spring 13 and spring 14 in combination. Since springs 13 and 14 are arranged in series with each other, the static spring rate evidently is smaller than the dynamic spring rate. In order to obtain a satisfactory damping of the unsprung mass, it is necessary that the ratio of dynamic to static spring rate also for the unsprung mass is sufficiently large. As was explained with regard to the diagram shown in Fig. 6, this ratio should preferably have a value of at least 1.5 to 2.

Also for the air springs shown in Figs. 3 and 4, dynamic and static spring rates are obtained both for the sprung and the unsprung mass. Since the modifications shown in Figs. 3 and 4 do not differ much from each other, the spring rates are in the following discussed for the preferred form shown in Fig. 4 only.

A correct relationship between the different spring rates is of importance for a satisfactory springing and damping of the sprung and unsprung mass and constitutes part of the present invention. These conditions are probably best described with reference to an actual example. The following figures thus apply to a passenger car having a sprung weight of 1000 lb. per wheel. A conventional tire for such a car has a spring rate of 1120 lb./in. In accordance with the invention, the differential piston air spring 23—24 is then designed for a spring rate with closed throttle control 25 of about the same size, say 1120 lb./in., and for a spring rate with open throttle control 25 of for example 67 lb./in.

Since the air spring 23—24 and the tire 28 are arranged in series with regard to the sprung mass 26, the dynamic spring rate for the sprung mass becomes 560 lb./in. and the static spring rate becomes 63 lb./in. The ratio dynamic to static spring rate is therefore about equal to 9, which means that fully aperiodic damping may be obtained for the sprung mass 26.

With regard to the unsprung mass 27 on the other hand, air spring 23—24 and tire 28 are arranged in parallel with each other, so that the dynamic spring rate for the unsprung mass becomes 2240 lb./in. and the static spring rate 1187 lb./in. The ratio dynamic to static spring rate is therefore about 1.9, which gives a satisfactory damping also for the unsprung mass.

The oscillations obtained for the above example are represented by curve 34 in Fig. 6 for the unsprung mass, and by curve 33 for the sprung mass, both curves being plotted on the same scale.

While the above example refers to a certain example typical for passenger cars, it is evident that the invention in a similar way may be adapted to other conditions. In accordance with the invention, it is thus only necessary that the ratio dynamic to static spring rate obtains satisfactory values preferably not below 1.5 or approximately 1.5, both with regard to the sprung and unsprung mass.

Within the scope of these conditions, the spring rates of the air spring may be changed within wide limits. By increasing for instance the length of the air cylinder 23, both the dynamic and the static spring rates are decreased, i. e. a softer spring action is obtained. If, as another example, the inner diameter of the differential piston 24 remains unchanged while the outer diameter is increased, larger dynamic spring rates are obtained, while the static spring rates becomes smaller. A larger tire, i. e. a lower tire spring rate, makes possible a corresponding reduction of the dynamic spring rate of the air spring, which increases the possibility for the air spring to give way for sudden shocks from the road.

Another advantage of the air spring in accordance with the invention is that both the load capacity and the spring rates readily may be adapted to different loads. This is, for example, accomplished by the arrangement shown in Fig. 7, which automatically maintains the height of the air spring constant, independent of the static load, simply by admitting or relieving a suitable amount of compressed air to or from the air spring. Compressed air for the air spring may accordingly be supplied from a special compressor driven by the motor of the car. It is of course also possible to use compressed gas from one of the cylinders of the motor. In Fig. 7, 35 denotes the top of one of the cylinders of the motor, which at 36 is provided with an opening for the supply of compressed gas. Opening 36 is conveniently dimensioned so that the supply of gas from cylinder 35 is limited to about 20% of its volume. At the outlet of opening 36 an excess pressure valve 37 is provided, enclosed in chamber 38. From chamber 38, the gas passes through conduit 39 and filter 40 to the compressed gas container 41. Conduit 42 serves to cool the gas in container 41. A float valve 44 permits condensate to be drained from container 41 through opening 43. From container 41, cooled and cleaned gas or compressed air is supplied to the air springs of the entire car, one of which is shown at the left in Fig. 7. The air spring consists of a differential piston 45 movable in a differential cylinder 46. In the conduit 47 connecting the air spring with the container 41, the non-return valve 48 is arranged. The chamber 49 in differential piston 45 communicates through openings 50 with chamber 51 and through openings 52 and 53 with chamber 54. The differential piston 45 is at 55 movably connected with the sprung mass of the vehicle and the differential cylinder 46 is at 56 movably connected with the unsprung mass or the wheel axle. Chamber 49 communicates through conduits 57 and 47 with container 41 and through conduit 58 with the atmosphere. Conduits 57 and 58 are controlled by needle valves 59 and 60, which normally are kept in their closed position by spring 61. At the bottom of differential cylinder 46 is fastened rod 62 with a conical top. Balls 66 are pressed against rod 62 by means of conical rings 64 and 65 and by spring 63. At its upper end spring 63 presses against collar 67 which is rigidly connected with cylinder 68 which is filled with a liquid. Cylinder 68 is movable on piston 69 which is rigidly connected with the differential piston 45. Between the lower side of piston 69 and the bottom of cylinder 68 is inserted spring 70. To the upper side of cylinder 68 is fastened fork 71.

The operation of the height control shown in Fig. 7 is as follows. In Fig. 7, the differential position 45 is shown in its intermediate position which is its position of equilibrium. Balls 66 are in an intermediate position on the cone of rod 62, springs 63 and 70 are in equilibrium with each other and fork 71 allows a certain play at the needle valves 59 and 60, which are kept in a closed position by spring 61. Assuming now that the load on the vehicle is increased, for example by taking in more passengers, the air spring is compressed, the differential piston 45 is lowered and the balls 66 are pressed outwardly by the cone on rod 62, whereby the upper conical ring 64 is moved upwardly. Since spring 63 is more powerful than spring 70, which in turn is more powerful than spring 61, fork 71 is moved upwardly until it opens needle valve 59. Compressed gas or air is now admitted from container 41 to chambers 49, 51 and 54 until the normal position of the differential piston 45 is reestablished. If, on the other hand, the load on the air spring is decreased, the differential piston 45 will move upwardly, balls 66 and conical ring 64 are allowed to be lowered under the pressure of springs 70 and 63. This causes fork 71 to open needle valve 60, which relieves compressed air until the normal length of the air spring is reestablished. The liquid filled cylinder 68 forms together with piston 69 a dash pot. The purpose of this dash pot is to delay the actuation of needle valves 59 and 60 for a certain interval, for example by 10 sec. This prevents the needle valves 59 and 60 from opening during the changes of short duration of the length of the air spring which occur during the normal oscillations of the sprung and the unsprung mass. The valves are only opened if an actual change in the load takes place so that unnecessary loss of compressed air is avoided. The time interval with which the dash pot acts may be adjusted by providing proper play between piston 69 and cylinder 68. As compressed gas is being taken from container 41, its pressure will fall below the maximum pressure in cylinder 35. Spring valve 37 opens at each stroke of the motor or compressor until the container 41 is again charged to its maximum pressure, whereupon the spring valve 37 remains closed. The non-return valve 48 prevents compressed air or gas from escaping from the air spring if the pressure in container 41 at any time should drop below the pressure in the air spring.

One of the disadvantages of the conventional mechanical springs for vehicles is that the height of the suspension changes with changes in the static load. These changes in the height of the spring become larger as the springs are made softer and as the pay load compared with the net weight of the vehicle increases. Light weight passenger cars, trucks and buses are particularly unfavourable in this respect. It has therefore been necessary to equip these vehicles with comparatively stiff springs. In addition, the effective spring clearance is reduced at extreme loads, so that with maximum load the spring may touch bottom, and with minimum load the wheels may leave the ground.

These deficiencies are avoided by the air spring embodying this invention. This is accomplished by the height control, described with reference to Figs. 7, which maintains the spring height constant, independent of the load. In this way, the maximum spring clearance is always available for taking up irregularities of the road. The air spring may be designed for a low static spring rate regardless of the existing static load changes. Another advantage is that the spring rates automatically are adapted to the load, so that the effectiveness of the suspension and the side characteristic remain the same for varying loads. Finally, the height control automatically compensates for air leakage in the air spring and prevents change of pressure in the air spring caused by changes in temperature.

Figure 8:
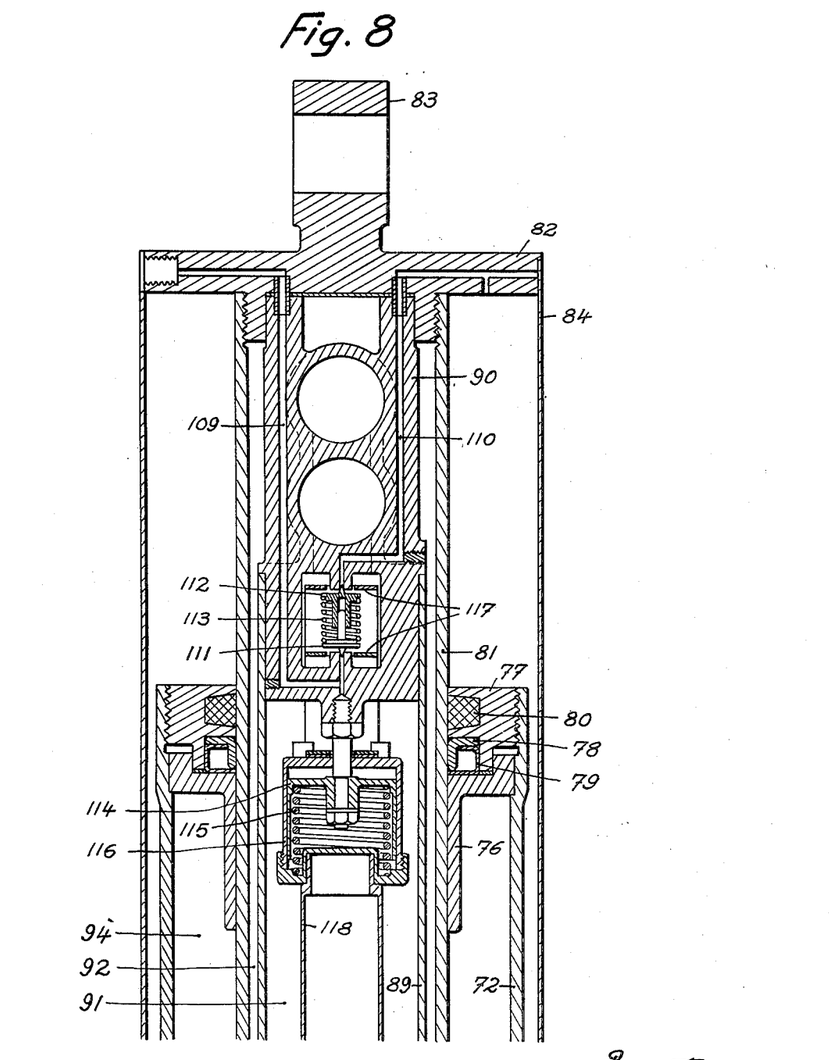
Figs. 8 and 9 are parts of a section through a complete air spring in accordance with the invention.
Figures 9, 11:
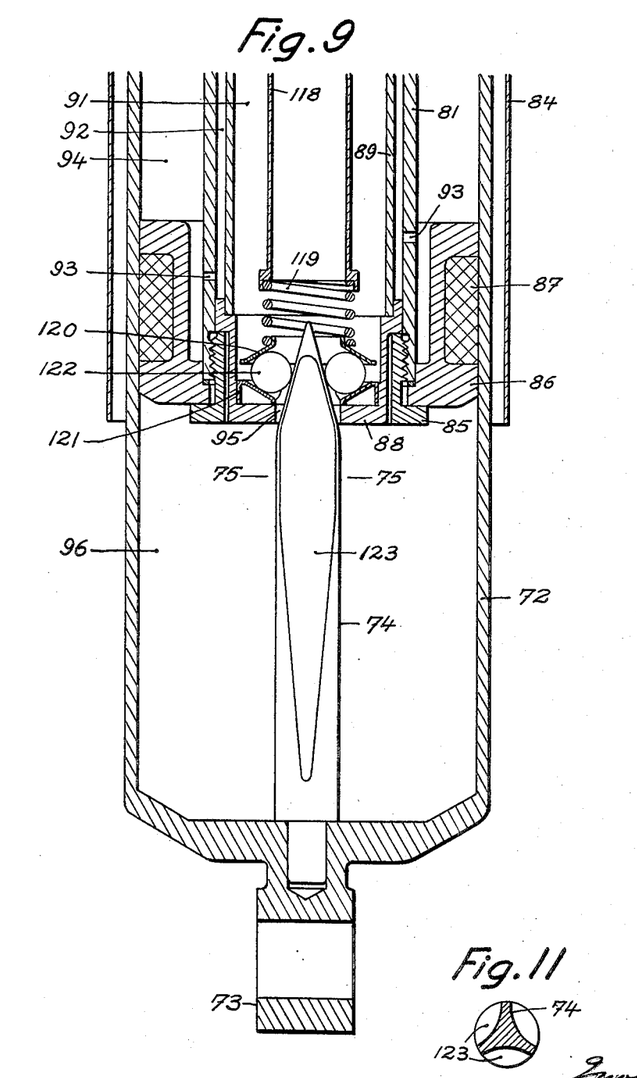
Fig. 11 is a section through a detail of Fig. 9.

An embodiment of the air spring according to the invention is shown in Figs. 8, 9, 10 and 11. Additional features and advantages of the invention will become apparent from the description of these figures. In these figures, 72 is the cylinder of the air spring which at 73 is movably connected with the wheel axle. Rod 74 is fastened at the bottom of cylinder 72. At 75, rod 74 has a cross section as shown in Fig. 11 with channels 123. At its upper end, rod 74 has the shape of a cone. Fastened to the upper end of cylinder 72 is ring slide 76 by means of ring nut 77. Between ring slide 76 and ring nut 77 the packing ring 78 is arranged and kept in its proper position by the flexible ring 79. Groove 80 in ring nut 77 is filled with suitable packing material for providing lubrication of the gliding surface and to prevent dust from getting into the air spring. Tube 81, which is screwed to the plate 82, forms part of the differential piston. The differential piston is at 83 movably connected with the car body or sprung mass. Tube 84 fastened to plate 82 serves as protection against dirt. Piston ring 86 is fastened to the lower end of tube 81 by means of the threaded ring 85, and at 87 provided with suitable packing material. The threaded ring 85 serves also as a lock for bottom ring 88, tube 89 and valve housing 90. Tube 89 and valve housing 90 separate the interior of tube 81 into chambers 91 and 92. Through openings 93 in tube 81, chamber 92 communicates with chamber 94 in cylinder 72. Chamber 91 communicates through opening 95 in bottom ring 88 with the lower chamber 96 in cylinder 72.

Two bores provided in the valve housing 90 contain two ball and two overflow or throttle valves and are inclined towards the horizontal in opposite direction. Balls 97 and 98 are movable in ball housings 99 and 100, provided with slots 101 and 102. On one side of collars 103 and 104 are formed the seats for the balls 97 and 98 and on the other side the seats for the overflow valves consisting of valve discs 105 and 106 and valve springs 107 and 108. The valve chambers for ball 98 and overflow or throttle valve 105 communicate through openings in the valve housing 90 with chamber 91 and the valve chambers for ball 97 and overflow or throttle valve 106 communicate through ports 90c and 90d with chamber 92.

In the lower part of valve housing 90 are arranged needle valves 111 and 112, forming part of the height control of the air spring. Channel 109, which is controlled by needle valve 111, serves for the admission of compressed air to the air spring, and through channel 110, which is controlled by needle valve 112, air may be exhausted to the atmosphere. Needle valves 111 and 112 are normally kept in a closed position by spring 113. Liquid-filled cylinder 116, piston 114 and spring 115 form a dash pot serving to delay the actuation of the needle valves 111 and 112 for a certain interval. Fork 117, actuating needle valves 111 and 112, is mounted on cylinder 116. At its lower end, cylinder 116 is in connection with tube 118 and spring 119, which, by means of the conical rings 120 and 121 presses balls 122 against rod 74. The lower conical ring 121 is provided with radial tracks for the balls 122 in order to keep the same in positions intermediate adjoining channels in rod 74. The operation of the height control shown in Figs. 8 to 11 is the same as was described with reference to Fig. 7 so that no further explanations are necessary at this point.

Figure 10:
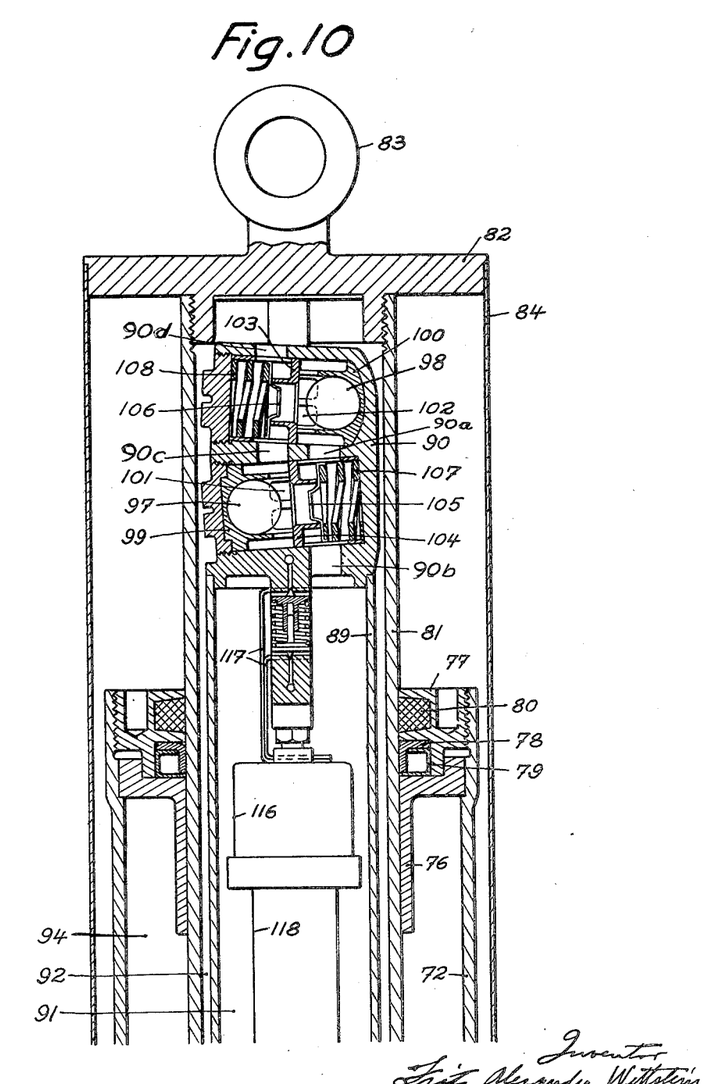
Fig. 10 is a section taken at a right angle to the section shown in Fig. 8.

The operation of the air spring shown in Figs. 8 to 11 is as follows. During equilibrium, the relative position of the differential pistons 81 and 86 and the cylinder 72 is as shown in Figs. 8 to 10. The pressure throughout the entire air spring, i. e. in chambers 96, 94, 92 and 91, is equalized and the pressure acting on the free area of the differential piston is in equilibrium with the sprung mass supported by the air spring. The throttle valves 105 and 106 are in a closed position and the pressure exerted by thin springs 107 and 108 are substantially equal to zero.

Assuming now a compression of the air spring, caused for example by an elevation in the road, whereby cylinder 72 is moving upwardly, the air in chamber 96 will be compressed and the air in chamber 94 will be expanded. The difference in pressure between chambers 96 and 94 keeps throttle valve 105 closed and opens throttle valve 106. A certain amount of compressed air is forced from chamber 96 through chamber 91, throttle valve 106 and chamber 92 to chamber 94. If, on the other hand, cylinder 72 is forced downward, throttle valve 106 remains closed and throttle valve 105 is opened and admits a certain amount of compressed air to pass from chambers 94 and 92 to chambers 91 and 96. Throttle valves 105 and 106 constitute the throttling or damping control of the air spring, determining its damping action. Openings 93 and 95 are of comparatively large size so that the pressure drop is chiefly determined by the throttle valves 105 and 106. In accordance with the invention, throttle valves 105 and 106 are so designed that the pressure drop caused by the same is substantially proportional to the volume of air passing through the valves per unit of time. This is accomplished, for example, by a design of the valves as shown in Fig. 8, whereby the valve disc is provided with an extension which continues through the opening provided by the valve seat and which extension has a predetermined shape. With a throttle valve of conventional type having a flat valve disc, the valve opening increases proportional with the stroke of the valve. With the throttle valve according to the invention on the other hand, the increase in effective valve opening with increasing valve lift is largest as the valve begins to open and the increase in the flow area becomes smaller with increasing elevation of the valve. The proportionality thus obtained between the pressure drop and the air volume passing through the throttle valves, produces the desired character in the oscillation of the sprung and unsprung mass of the vehicle, with smooth and harmonic changes of the damping forces. At a certain stroke of the valves 105 and 106, the above described restriction of the valve opening is discontinued and, from this point on, the effective flow area increases at a faster rate. This prevents the damping forces from becoming too large during particularly fast actions of the air spring.

When the cylinder 72 is moved downwardly sufficiently from its intermediate position, ring slide 76 enters the annular recess in the part 86 and successively covers the openings 93 at different levels in tube 81. Similarly, when the cylinder 72 moves upwardly by a certain distance, the rod 74 will gradually close opening 95 between chambers 96 and 91. This produces a smooth acting limitation of the stroke of the air spring. The operation of this limitation of the spring stroke will be apparent from the diagram shown in Fig. 5. In this diagram, the abscissae 124 represents the stroke of the air spring and the ordinate 125 represents the force exerted by the air spring. Curve 126 is the static spring rate with reference to the sprung mass. This curve is obtained if the connection between chambers 94, 92, 91 and 96 is wide open. Curve 127 shows the dynamic spring rate with reference to the sprung mass, and this curve is obtained if the throttle valves 105 and 106 are closed. Thus, chamber 92 acts as compression volume for the stroke volume 94, and chamber 91 is the compression volume for the stroke volume 96. The dotted line 128 in Fig. 5 indicates the spring rate of a conventional tire. As mentioned previously, the total dynamic spring rate for the sprung mass, curve 127, is preferably made about half as large as the spring rate 128 of the tire. Finally, line 129 shows the spring rate for the end of the compression stroke when the connection between stroke volume 96 and compression volume 91 is closed, and line 130 shows the spring rate for the end of the expansion stroke, when the connection between stroke volume 94 and compression volume 92 is closed. Actually, the connection between stroke and compression volume is not closed momentarily, but the closing takes place gradually. This results in a smooth action for the stroke limitation and has the further advantage that a certain damping effect is obtained also for the extreme parts of the spring stroke. This damping effect is the result of the air being throttled in the gradually decreasing openings 93 and 95.

As previously explained, a particularly soft spring action may be obtained with the air spring according to the invention, due to the fact that a low static spring rate for the sprung mass may be provided. This may however result in an excessive inclination of the sprung mass when taking a curve, i. e. the vehicle may become subject to excessive rolling. This is prevented by a rolling control consisting of the two ball valves 97 and 98. Their operation is as follows, it being noted that the air spring according to Fig. 10 is so mounted on the vehicle that the center lines of ball valves 97 and 98 are located in a plane perpendicular to the longitudinal center line of the vehicle, and that the lower ball valve 97 opens towards the outside of the vehicle. As a result of a certain inclination of the roll control valves, which inclination is apparent from Fig. 10, valves 97 and 98 will be in their opening position when the movement of the vehicle is following a straight line. If the vehicle for example makes a right hand turn, ball 97 will be retained in its opening position by centrifugal force, whereas ball 98 by centrifugal force will be moved to the left towards its closing position, thereby closing the connection between chambers 96 and 91 on the one side and chambers 92 and 94 on the other side. During the compression stroke, the air spring will therefore work according to the comparatively high dynamic spring rate 127 in Fig. 5. During the expansion stroke on the other hand, the action of the air spring does not differ from the normal, the air from chamber 94 passing through the open ball valve 97 and through throttle valve 105 to chamber 96. At the opposite side of the vehicle, where the air spring is installed in such a way that ball valves 97 and 98 open in opposite directions, the dynamic spring rate is established during the expansion stroke, while normal spring action is obtained for the compression stroke. As a result of this, the inclination of the vehicle is strictly limited by the action of the comparatively large dynamic spring rate. At the same time, the action of the air spring remains normal in the opposite direction, i. e. during the expansion stroke at the curve-outer side of the vehicle, and during the compression stroke at the curve-inner side of the vehicle. A soft spring action is thus obtained for all road obstructions which tend to overthrow the vehicle towards the curve-outer side, i. e. for negative road waves on the curve-outer side and for positive road waves on the road-inner side. The roll control according to the invention has the additional advantage that it does not in any way affect the normal action of the air springs as long as the vehicle moves on a straight course. For the correct function of the balls 97 and 98, it is of importance that they are not affected by the flow of air through the valves. In accordance with the invention, balls 97 and 98 are protected from the air flow by the ball housings 99 and 100. These housings are so designed and their openings 101 and 102 are so arranged that the flow of air is led past the balls 97 and 98 when they are in their opening positions.

A further advantage of the air spring shown in Figs. 8 to 11 is its compact self-contained design, combining in a single apparatus both springing and damping action with all the necessary controls built into the design.

Although the invention in the foregoing has been described chiefly with reference to only one embodiment, it is apparent that the design may be modified in many ways within the scope of the invention.

What we claim is:

1. A pneumatic springing and damping arrangement for vehicles comprising a cylinder containing pressure air, a piston movable in the cylinder and separating air spaces in said cylinder, the pressure area of said piston facing one air space differing from the pressure area facing the other air space, a communication between the air spaces on opposite sides of the differential piston, a spring loaded throttle valve provided in the said communication and actuated by the pressure difference in the air spaces on opposite sides of the piston so as to control the volume of air passing through the throttle valve substantially proportionate with the said pressure difference, a supply conduit for supplying compressed air to the said air spaces, an exhaust conduit for relieving air from the said air spaces, valves to control the said supply and the said exhaust of compressed air, first resilient means acting to close the said valves, second resilient means acting to open the said valves, actuating means substantially responsive to an intermediate part only of the stroke of the differential piston acting on said second resilient means and a dash pot arranged to delay the opening of the valves.

2. A pneumatic springing and damping arrangement for vehicles comprising a cylinder containing pressure air, a piston movable in the cylinder and separating air spaces in said cylinder, the pressure area of said piston facing one air space differing from the pressure area facing the other air space, a communication between the air spaces on opposite sides of the piston, damping or throttle valves in the said communication to throttle the flow of air therethrough and restrictions in series with said valves, means responsive to the position of the piston in the said cylinder to substantially close the said restrictions as the piston approaches its extreme positions to provide for end buffer action, means to supply compressed air to the said air spaces, means to relieve air from the said air spaces and means responsive to the position of the piston in the said cylinder to control the said supply and the said exhaust of compressed air.

3. A pneumatic springing and damping arrangement for vehicles comprising a cylinder containing pressure air, a piston movable in the cylinder and separating air spaces in said cylinder, the pressure area of the piston facing one air space differing from the pressure facing the other air space, a communication between the air spaces on opposite sides of the piston, a throttling arrangement in the said communication to throttle the flow of air therethrough, means responsive to centrifugal force acting upon the vehicle in curves to close the said communication, supporting members for said centrifugal responsive means adapted to keep the latter means in a position protecting said means against air flow action in the open position, means to supply compressed air to the said air spaces, means to relieve air from the said air spaces and means responsive to the position of the differential piston in the said cylinder to control the said supply and the said exhaust of compressed air.

4. A self-contained springing and damping arrangement for vehicles comprising a cylinder containing pressure air, a piston movable in the cylinder and separating air spaces in said cylinder, the pressure area of said piston facing one air space differing from the pressure area facing the other air space, throttling means adapted to throttle the flow of air between the air spaces on opposite sides of the piston and control means adapted to adjust the air pressure in the said cylinder in accordance with the static load, at the intermediate portion of the piston, said throttling means and said control means being arranged within the said cylinder and the said piston.

5. A pneumatic springing and damping means to be mounted between the unsprung mass and sprung mass of a vehicle, comprising a cylinder containing pressure gas, a movable piston separating gas chambers from one another in the cylinder and having opposite pressure surfaces of different pressure area, one surface facing one gas chamber and the other facing the other gas chamber, a communication between said gas chambers and throttling means in the communication, the ratio between the dynamic spring rate of the pneumatic spring formed by the piston and the cylinder on one hand and the static spring rate of said spring with respect to the unsprung mass as well as to the sprung mass of the vehicle being equal to or exceeding 1.5.

6. A pneumatic springing and damping arrangement for vehicles comprising a cylinder containing pressure gas, a movable piston separating gas chambers from one another in the cylinder and having opposite pressure surfaces of different pressure area, one surface facing one gas chamber and the other facing the other gas chamber, a communication between the gas chambers on opposite sides of the piston, a throttling arrangement in the said communication to throttle the flow of gas therethrough, means to supply compressed gas to the said gas chambers, means to relieve gas from said gas chambers and means responsive to the position of the piston in said cylinder to control said supply and said exhaust of compressed gas.

7. A pneumatic springing and damping arrangement for vehicles, comprising a cylinder containing pressure gas, a piston movable in the cylinder and separating gas spaces in said cylinder, the pressure area of said piston facing one gas space differing from the pressure area facing the other gas space, a communication between said gas spaces, a throttling arrangement in said communication to throttle the flow of gas therethrough, a supply conduit for supplying compressed gas to the cylinder, an exhaust conduit for relieving gas from the cylinder, valves to control said supply and exhaust of compressed gas, actuating means substantially responsive to an intermediate small part only of the stroke of the piston to actuate said valves and a dash-pot located between said actuating means and said valves to delay the opening of the valves.

8. A pneumatic springing and damping arrangement for vehicles, as claimed in claim 7 and further characterized by the fact that supply valve, exhaust valve, dash-pot, and actuating means are located symmetrically relatively to a common line.

9. A pneumatic springing and damping arrangement for vehicles as claimed in claim 7 and further characterized by the fact that the supply valve, exhaust valve and dash-pot, and actuating means are located coaxially relatively to the piston.

10. A pneumatic springing and damping arrangement for vehicles comprising a cylinder, a piston movable in said cylinder, said piston separating spaces for pressure gas, a communication between said spaces, means in said communication to throttle the flow of gas therethrough, a supply conduit for supplying compressed gas to the cylinder, an exhaust conduit for relieving gas from said cylinder, valves to control said supply and exhaust, first resilient means to close said valves, second resilient means to open said valves, actuating means responsive substantially to an intermediate part only of the stroke of the piston in the cylinder or actuation of said second resilient means and a dash pot adapted to delay the opening of said valves, the valves, the actuating means and the dash pot being arranged coaxially in the cylinder.

11. A pneumatic springing arrangement for vehicles comprising a cylinder, a piston movable in said cylinder, a supply conduit for supplying pressure fluid to said cylinder, an exhaust conduit for relieving pressure fluid from said cylinder, valves to control said supply and said exhaust of pressure fluid, first resilient means acting to close said valves, second resilient means acting to open said valves, actuating means responsive to the relative position of said piston within said cylinder acting on said second resilient means and a dash pot arranged to delay the opening of said valves; said valves, said first resilient means, said second resilient means, said actuating means and said dash pot being arranged coaxially within said cylinder and said piston.

FRITZ ALEXANDER WETTSTEIN.

REFERENCES CITED

The following references are of record in the file of this patent:

UNITED STATES PATENTS

| Number | Name | Date |
|---|---|---|
| 770,128 | Teal | Sept. 13, 1904 |
| 1,094,567 | Hofmann | Apr. 28, 1914 |
| 1,371,648 | Schmidt | Mar. 15, 1921 |
| 1,544,850 | Messier | July 7, 1925 |
| 1,648,908 | Mercier | Nov. 15, 1927 |
| 2,073,180 | Rink | Mar. 9, 1937 |
| 2,145,891 | Rice | Feb. 7, 1939 |
| 2,167,928 | Johnson | Aug. 1, 1939 |
| 2,208,537 | Brown | July 16, 1940 |
| 2,338,895 | Boulogne et al. | Jan. 11, 1944 |
| 2,361,575 | Thompson | Oct. 31, 1944 |

FOREIGN PATENTS

| Number | Country | Date |
|---|---|---|
| 681,842 | Germany | Oct. 3, 1939 |